United States Patent [19]

Thumm

[11] 4,083,567
[45] Apr. 11, 1978

[54] LUBRICANT SEAL

[75] Inventor: Herbert H. Thumm, Denver, Colo.

[73] Assignee: The Mechanex Corporation, Englewood, Colo.

[21] Appl. No.: 776,708

[22] Filed: Mar. 11, 1977

Related U.S. Application Data

[62] Division of Ser. No. 657,095, Feb. 11, 1976, Pat. No. 4,037,849.

[51] Int. Cl.² ............................................. F16J 15/34
[52] U.S. Cl. ...................................... 277/37; 277/153
[58] Field of Search .................. 277/37, 95, 96, 96.1, 277/151, 152, 153

[56] References Cited

U.S. PATENT DOCUMENTS

| 3,086,781 | 4/1963 | Hudson et al. | 277/82 |
| 3,108,815 | 10/1963 | Hayne et al. | 277/37 |
| 3,120,959 | 2/1964 | Jensen et al. | 277/37 |
| 3,156,474 | 11/1964 | Nelson | 277/153 |
| 3,179,424 | 4/1965 | Carson et al. | 277/37 |
| 3,341,264 | 9/1967 | Otto | 277/37 |
| 3,425,758 | 2/1969 | Scheifele | 277/168 |
| 3,482,844 | 12/1969 | McKinven | 277/82 |
| 3,561,770 | 2/1971 | Corsi | 277/134 |
| 3,746,351 | 7/1973 | Tucker | 277/153 |
| 3,963,248 | 6/1976 | Bainard | 277/82 |

Primary Examiner—Robert I. Smith
Attorney, Agent, or Firm—Thomas E. Torphy; James R. Hagen

[57] ABSTRACT

A unitized, hand installable lubricant seal for sealing between a bore and a shaft subject to rotation relative to each other, such as a vehicle wheel hub and axle, provides a resilient surface for sealingly engaging the bore, a resilient surface for sealingly engaging the shaft and a resilient seal lip to rigid wear surface running seal between the reslient surfaces. No special tools are required to install or remove the seal.

1 Claim, 8 Drawing Figures

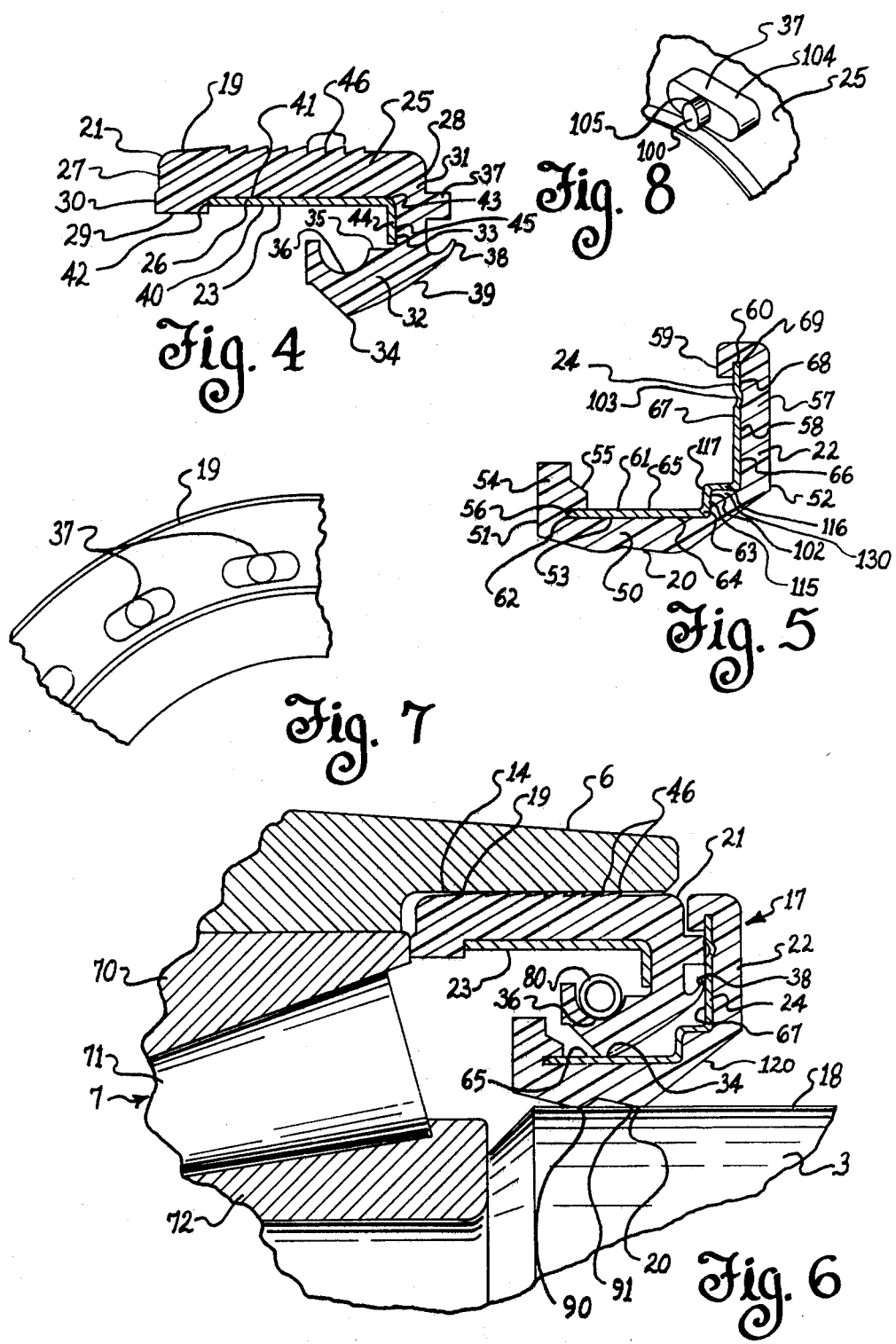

LUBRICANT SEAL

This is a division of application Ser. No. 657,095, filed Feb. 11, 1976 and now U.S. Pat. No. 4,037,849.

BACKGROUND OF THE INVENTION

Prior art seals for sealing between a bore and a shaft subject to rotation relative to each other have often consisted of two or more components which must be shipped separately, installed separately and carefully oriented with respect to each other and/or have required a special tool to enable achievement of a metal to metal seal between a rigid seal component and either the bore or the shaft.

In specific reference to lubricant seals for vehicle wheels the need to pound a seal component into sealing engagement with either a bore in the wheel hub or with a peripheral surface on the axle often requires a special tool, is time consuming and, in some instances, damaging to the sealing surface of either the seal or the wheel hub or axle. Such surfaces and adjacent components, such as bearings, are also subject to damage upon removal of the seal.

SUMMARY OF THE INVENTION

This invention relates to an improved lubricant seal for sealing between a bore and a shaft. The seal is hand installable and self-aligning and is a preassembled or unitized seal which can be shipped, stored and installed as a completed assembly.

DESCRIPTION OF THE DRAWINGS

FIG. 4 shows the cross-sectional configuration of the bore engaging component of this invention;

FIG. 5 shows the cross-sectional configuration of the shaft engaging component of this invention;

FIG. 6 is a partial view of a sectioned wheel hub, axle and lubricant seal of this invention and shows how the components of the lubricant seal coact with each other and with the hub and axle;

FIG. 7 is a partial front view of the bore engaging component shown in FIG. 4; and FIG. 8 is a partial perspective view of the component shown in FIG. 7.

DESCRIPTION OF THE PREFERRED EMBODIMENT

Figure 1:
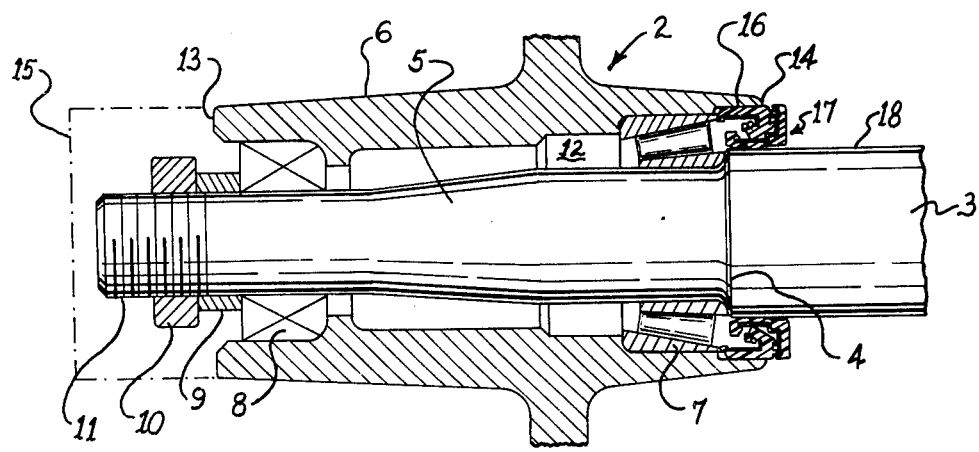
FIG. 1 is a sectional view of a typical vehicle wheel hub and axle assembly having a lubricant seal of this invention.

FIG. 1 shows a typical vehicle wheel hub and axle assembly 2 which is comprised of an axle 3, an axle shoulder 4 and a spindle 5. A wheel hub 6 which is substantially cylindrical in shape is mounted concentric to spindle 5 and adapted for rotation with respect to spindle 5 by friction reducing means such as tapered roller bearing assembly 7 and bearing means 8, shown by convention only. Axle shoulder 4 and spacer means 9 and threaded nut 10 on a threaded end 11 of spindle 5 maintain hub 6 in a desired axial position on spindle 5.

To reduce friction and prolong bearing life the bearings must be lubricated. To lubricate the bearings it is common practice to maintain a desirable amount of a lubricant, such as oil, within chamber 12 of the hub 6 and closure means are provided at each end 13 and 14 of hub 6 to maintain the lubricant within the assembly and prevent undesirable fluids and particulate matter from contaminating the lubricant.

Conventional hub caps well known to those skilled in the art of vehicle design or vehicle manufacture or maintenance generally serve as a closure means 15, shown in phantom lines, at end 13 of hub 6.

At end 14 of hub 6 the closure means must seal between the hub 6 and the axle 3 and maintain a fluid seal both when hub 6 is rotating with respect to axle 3 and when there is no rotative motion between the hub and axle.

A bore 16 within hub 6 is concentric with and radially outwardly spaced from axle 3 and a seal means, such as seal 17 of this invention, is disposed to sealingly engage bore 16 and a continuous annular portion of the peripheral surface 18 of axle 3 to prevent fluid flow between surface 18 and bore 16.

Figure 2:
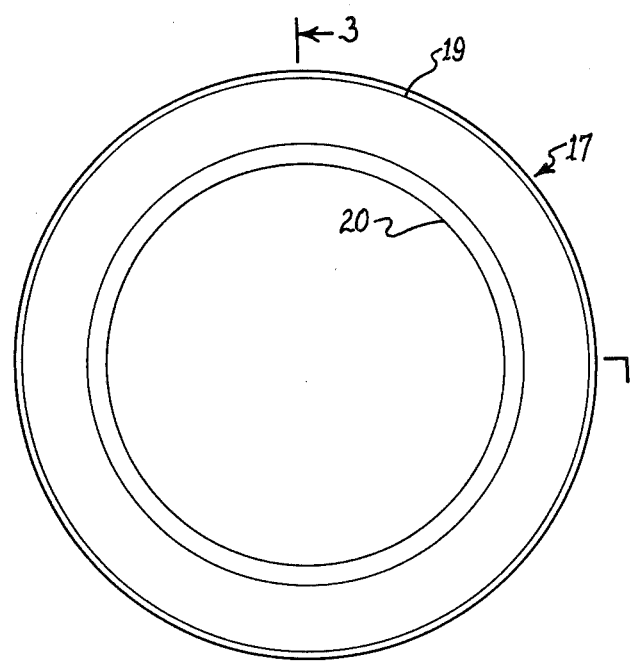
FIG. 2 is a front view of the lubricant seal of this invention.

Referring to FIG. 2 lubricant seal 17 is annular in shape and has a radially outwardly facing surface 19 for sealingly engaging a radially inwardly facing surface of a bore and a radially inwardly facing surface 20 for sealingly engaging a radially outwardly facing surface of an axle or shaft.

Figure 3:
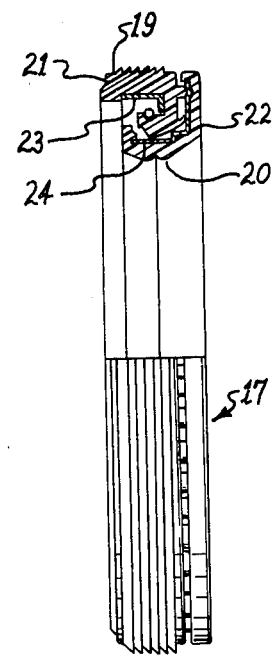
FIG. 3 is a partially sectioned side view of the lubricant seal of FIG. 2.

FIG. 3 shows a side view of seal 17 of FIG. 2 in which the upper front quadrant of the seal has been cut away as indicated by appropriate section lines in FIG. 2. Seal 17 is comprised of a resilient bore engaging member 21 and a resilient axle or shaft engaging member 22. An annular rigid support member 23 provides support and structural integrity for member 21 and an annular rigid support and wear surface member 24 provides support for resilient member 22. Bore engaging surface 19 is on resilient member 21 and axle or shaft engaging surface 20 is on member 22.

Resilient members 21 and 22 are preferably formed of an elastomeric material which is durable, resilient and oil resistant. Nitrile synthetic rubber compounds, such as Buna-N, work well. Also, materials such as fluoroelastomers, polyacrylates and silicones may be used. Rigid members 23 and 24 are preferably formed of steel.

FIG. 4 shows an enlarged cross section of annular resilient member 21 and rigid support member 23. Member 21 is comprised of a substantially cylindrical outer band 25 having a radially outwardly facing surface 19, a radially inwardly facing surface 26, which is concentric with and radially inwardly spaced from surface 19, and a first or wheel facing side 27 and a second or vehicle facing side 28. An integral assembly maintenance lip 29 projects radially inwardly from side 27 substantially perpendicular to surface 26. An abutment projection 30 integral with band 25 and lip 29 extends axially outwardly from side 27.

An integral connective side web 31 extends radially inwardly from side 28 of band 25 and is connected to an integral seal band 32. Side web 31 has a first or wheel facing side surface 33 and a second or vehicle facing side surface which is a radially oriented extension of side 28 of cylindrical band 25.

Integral seal band 32 projects radially inwardly from side web 31 and has as its radially innermost surface a lubricant seal lip 34. A radially outermost surface 35 of seal band 32 extends axially from a first or wheel facing side surface 33 of side web 31. Surface 35 is substantially perpendicular to surface 33. Surface 35 is radially outwardly facing, coaxial with and radially inwardly spaced from surface 26 of band 25. A biasing means retention means, such as garter spring groove 36, is provided in surface 35. Garter spring groove 36 is coaxial with and radially outwardly spaced from seal lip 34.

A spacer means, such as integral spacer tab 37 projects axially outwardly from side 28 of side web 31 and an integral auxiliary or contaminant seal lip 38 also extends axially outwardly from side surface 28 of side web 31. Spacer tabs 37 are preferably arranged in a circular pattern coaxial with and radially inwardly spaced from surface 19 of band 25, as best shown in FIG. 7.

FIG. 8 shows in perspective one of the spacer tabs 37 shown in FIG. 7. The tabs 37 are preferably formed integral with member 25. Each tab is comprised of a main body portion 104 and a wear surface contacting portion 105 having end 100 which actually contacts wear surface 67 of rigid member 24. The main body portion 104 provides strength and the cylindrical wear tip or button provides a reduced surface area to provide a reduction in friction between end 100 and a wear surface 67, such as shown in FIGS. 5 and 6.

Referring again to FIG. 4 a frusto-conical shaped assembly ramp 39 is formed between lubricant seal lip 34 and auxiliary seal lip 38.

Annular rigid support member 23 is comprised of a cylindrical band portion 40 having a radially outwardly facing outer surface 41 and a first or wheel facing side 42 and a second or vehicle facing side 43. An integral rigid side band 44 projects radially inwardly from side 43 of band 41 and is oriented substantially perpendicularly to band 41. Rigid side band 44 has a vehicle facing side surface 45 which is disposed adjacent surface 33 of side web 31 for supporting side web 31 against axial movement, such as when an axial force directed toward member 23 is imposed on spacer tab 37.

A series of continuous annular sealing ridges 46 are preferably formed integral with surface 19 and project radially outwardly from surface 19.

Resilient member 21 and rigid member 23 are formed separately and then assembled as shown in FIG. 4. As member 21 is resilient it is forced over rigid member 23 until assembly maintenance projection 29 clears side 42 of band 40 and, due to the memory of the resilient material, moves radially inwardly to engage side 42 and maintain rigid member 23 within member 21.

Cylindrical band portion 40 of rigid member 23 prevents radially inward movement of band 25 and integral rigid side band 44 supports resilient side web 31 against axial movement and thus aids in maintaining spacer tabs 37 and auxiliary seal lip 38 in a desired position.

FIG. 5 shows an enlarged cross section of annular resilient member 22 and rigid support and wear surface member 24.

Axle or shaft engaging resilient member 22 is comprised of a cylindrical band portion 50 having a first or wheel facing side 51, a second or vehicle facing side 52, a radially inwardly facing surface 20 and, concentric with and radially outwardly spaced from surface 20, a radially outwardly facing surface 53.

An assembly maintenance rim 54 extends radially outwardly from side 51 of band 50. Rim 54 is substantially perpendicular to surface 53 of band 50 and has an axial projection 55 which extends axially to overlap or overhang a portion of surface 53 for forming a first rigid member retention groove 56.

A resilient side member 57 is formed integral with and extends radially outwardly from side 52 of band 50. Side member 57 is substantially perpendicular to surface 53 of band 50. Side member 57 has a first or wheel facing side surface 58 and a second or vehicle facing side surface which is an extension of side 52 of band 50. An assembly maintenance projection 59 is formed integral with a peripheral or radially outermost portion of surface 58 and projects radially inwardly to overlap or overhang a portion of surface 58 for forming a second rigid member retention groove 60.

Rigid support and wear surface member 24 is comprised of a cylindrical band portion 61 having a first or wheel facing side 62, a second or vehicle facing side 63, a radially inwardly facing surface 64 and a radially outwardly facing wear surface 65.

An anchor recess, such as right angle groove 102, is preferably formed integral with second side 63 of cylindrical band portion 61. Groove 102 is comprised of leg 115 which extends radially outwardly from side 63 and leg 116 which is integral with and extends axially from a radially outermost portion 117 of leg 115.

An integral rigid side member 66 projects radially outwardly from leg 116 of groove or recess 102. Side member 66 has a first or wheel facing axially facing wear surface 67, a second or vehicle facing axially facing surface 68, a friction reducing and stiffening groove 103 and a terminal peripheral portion 69.

Resilient member 22 and rigid member 24 are formed separately and assembled in the relationship shown in FIG. 5 by placing side 62 of rigid band 61 into retention groove 56 and placing peripheral portion 69 of side member 66 in retention groove 60, thus causing annular resilient member 22 to be locked about annular rigid member 24. The anchor recess 102 engages a complementary shoulder 130 on resilient member 22 and thus serves to prevent member 22 from sliding axially or radially relative to member 24. Radially outwardly facing resilient surface 53 and radially inwardly facing rigid surface 64 are in sealing engagement with each other for preventing fluid flow between surfaces 53 and 64. Additionally, band portion 61 of rigid member 24 limits radial outward movement of band portion 50 of resilient member 22 and rigid side member 66 provides axial support for resilient side member 57.

FIG. 6 shows in an enlarged cross sectional view how members 21, 22, 23 and 24 coact with each other when assembled to form seal 17, which is placed in service between the bore 14 of wheel hub 6 and the peripheral surface 18 of axle 3.

A typical conventional bearing assembly 7 comprising a bearing cup 70, bearing rollers, such as tapered roller 71, and bearing cone 72 is interposed between spindle 5 and hub 6.

Resilient radially outwardly facing surface 19 of member 22 is sealingly engaged with the radially inwardly facing surface of bore 14.

Lubricant seal lip 34 encircles and is in sealing engagement with wear surface 65 of rigid member 24 and contaminant seal lip 38 is sealingly engaged with a continuous annular portion of wear surface 67 of rigid member 24.

A biasing means, such as garter spring 80, is retained within retention groove 36 to radially inwardly urge lubricant seal lip 34 into continuous engagement with wear surface 65 for aiding in preventing fluid flow between lip 34 and surface 65.

Resilient radially inwardly facing surface 20 of member 22 is sealingly engaged with the peripheral surface 18 of axle 3 for preventing fluid flow between member 22 and axle 3.

Preferably, seal ridges 90 and 91 extend radially inwardly to comprise surface 20 and effect a seal, as shown. Each seal ridge 90 and 91 serves to provide a continuous annular substantially dense or concentrated resilient sealing pressure against surface 18 and therefore each ridge readily conforms to any surface irregularities which may be present on the external surface of an axle.

In the same manner, resilient sealing ridges 46 on surface 19 of resilient member 21 also serve to readily conform to any surface irregularities present on the surface of bore 14.

To assemble the preassembled or unitized seal 17 shown in FIGS. 2 and 3 members 21 and 23 are assembled into the relationship shown in FIG. 4 and members 22 and 24 are assembled into the relationship shown in FIG. 5 to form two subassemblies. The garter spring 80 may be placed in retention groove 36 at this time. Annular assembly ramp 39 of member 21 is then placed adjacent assembly maintenance rim 54 of member 22 and the two subassemblies are forced axially toward each other causing resilient seal band 32 to spread radially outwardly and be forced over rim 54. The inherent elasticity of resilient seal band causes the seal band to retract radially inwardly once it has cleared rim 54 and lubricant seal lip 34 encircles and engages surface 65 of member 24.

Annular garter spring 80 in retention groove 36, as shown in FIGS. 3 or 6, urges the seal band radially inwardly and aides in assuring that the components remain mutually entrapped. Seal 17, so assembled, is shipped and installed in the preassembled or unitized from, as shown in FIGS. 2 or 3.

To effect installation of seal 17 the hub 6, referring to FIG. 6, is removed from spindle 5 and seal 17 is forced axially into the bore 14 so the seal ridges 46 sealingly engage the surface of bore 14. Seal 17 is forced axially inwardly, preferably by hand, until abutment projection 30 rests against an appropriate locating surface, such as a portion of bearing cup 70.

Hub 6 is then replaced on spindle 5 and forced, preferably manually, axially toward the axle 3 until properly seated. Upon forcing hub 6 toward its proper seat on spindle 5 frusto-conical surface 120 pilots member 24 over the axle and ridges 90 and 91 sealingly engage surface 18 of the axle.

As member 24 is forced over the axle its resistance to axial movement forces rigid wear surface 67 into engagement with an end 100 of each spacer tab 37. Spacer tabs 37 then assure proper alignment of members 21 and 24.

As shown in FIG. 4, auxiliary seal lip 38 extends axially outward beyond the ends 100 of spacer tab 37. When seal 17 is installed the auxiliary seal lip 38 is then inherently biased into sealing engagement with wear surface 67.

Upon installation the ends 100 of spacer tabs 37 are engaged with a portion of surface 67 on each side of groove 103 but after an initial wear in period of rotational movement of the member 21 relative to rigid member 24 the ends of the tabs are worn down sufficiently so that they no longer have any substantial contact with surface 67. Groove 103 serves to stiffen portion 66 of member 24 and also, due to reduction of surface engagement with end 100 of each spacer tab, it reduces the frictional engagement between the spacer tabs and surface 67 to reduce frictional heat under dynamic conditions.

Auxiliary or contaminant seal lip 38 is self cleaning in the application shown in FIG. 6 as when it rotates it tends to impel contaminants which contact it radially outwardly by centrifugal force.

Notwithstanding the fact that in the applications shown herein the bore engaging components, member 21 and, of course, member 23, rotate upon vehicle movement and the axle or shaft engaging component, member 22, and, of course, member 24, remain fixed it will be readily understood by those skilled in the art that the fluid seal of this invention as taught herein will be useful for other applications where the axle or shaft rotates and the bore is fixed, i.e. not subject to rotation under normal circumstances.

Additionally, it will be readily appreciated by those skilled in the art that seals of this invention as taught herein may be used on the drive wheels of vehicles. In such applications the resilient radially inwardly facing surface of the axle engaging member would sealingly engage the axle housing.

What is claimed is:

1. An axle engaging means for a vehicle wheel lubricant seal, said means comprising a resilient elastomeric member and a rigid member, each of said members having a cylindrical band portion having a wheel facing side and a vehicle facing side and a side member extending radially outwardly from said vehicle facing side of said cylindrical band portion, said cylindrical band portion of said rigid member having a radially inwardly facing surface surrounding and sealingly engaged with a radially outwardly facing surface of said cylindrical portion of said resilient member, said side member of said rigid member having a vehicle facing side engaged with a wheel facing side of said side member of said resilient member, said wheel facing side of said cylindrical band portion of said resilient member being engaged with said wheel facing side of said cylindrical band portion of said rigid member by a locking groove formed in said resilient member and a continuous peripheral edge of said side member of said rigid member being covered by a locking groove formed in said side member of said resilient member for maintaining said resilient member engaged with said rigid member and an annular anchor recess having a right angle cross section formed integral with said rigid member, said anchor recess being formed in a continuous annular portion of said vehicle facing side of said rigid member, said anchor recess having a first leg extending radially outwardly from said cylindrical band portion of said rigid member and a second leg integral with a radial outermost periphery of said first leg and extending substantially perpendicular to said first leg toward said rigid side member and said rigid side member being integral with said second leg and extending radially outwardly from said second leg of said anchor recess and an annular shoulder extending radially outwardly from said vehicle facing side of said cylindrical band portion of said resilient member, said shoulder having a radially outwardly facing surface for engaging a radially inwardly facing surface of said second leg of said anchor recess and a radially extending wheel facing side surface for engaging a vehicle facing side surface of said first leg of said anchor recess for preventing axial movement of said resilient member toward said wheel facing side of said rigid member when said axle engaging means is slid axially onto said axle for aiding in maintaining said resilient member locked about said rigid member during installation of said axle engaging means.

* * * * *